Dec. 6, 1938. J. ROBINSON 2,138,883
AUTOMATIC TRAIN PIPE CONNECTER
Original Filed Aug. 29, 1934

INVENTOR.
JOSEPH ROBINSON.
BY
ATTORNEYS.

Patented Dec. 6, 1938

2,138,883

UNITED STATES PATENT OFFICE 2,138,883

AUTOMATIC TRAIN PIPE CONNECTER

Joseph Robinson, New York, N. Y., assignor of one-half to Roy M. Wolvin

Application August 29, 1934, Serial No. 741,989
Renewed March 14, 1938

4 Claims. (Cl. 285—58)

An object of my invention is to provide improved means for removing defective gaskets from between the faces of coupled connecter heads. The construction includes a longitudinally shiftable non-rotatable plunger employed to secure and release the gasket carrying conduit. The advantages of this arrangement are that it anchors the conduit against all movement while in place, and permits it to be safely released from the service position while under air pressure.

Figure 1:
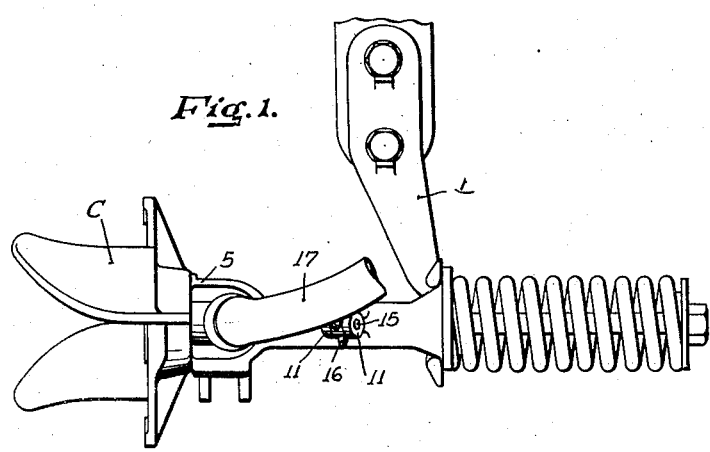
Figure 2:
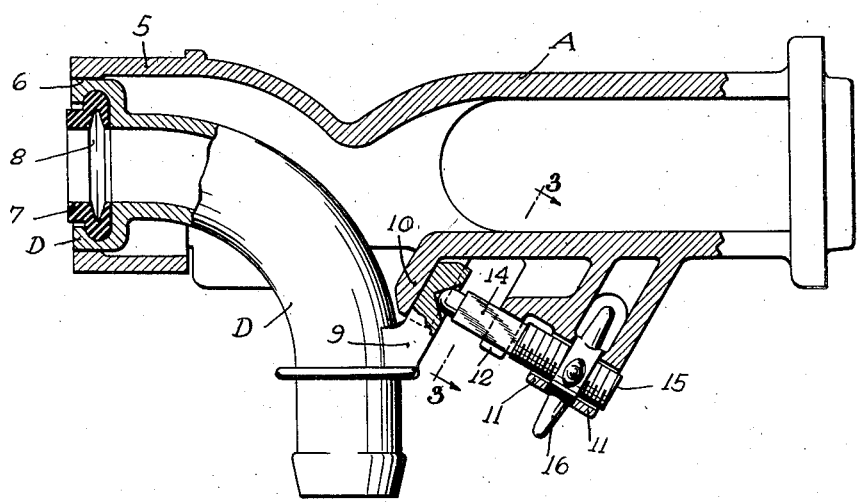
Figure 3:
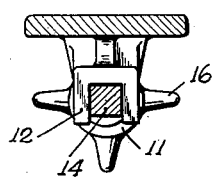

In the accompanying drawing Figure 1 is a side elevation of an automatic connecter provided with my improvement;

Figure 2 is an enlarged sectional plan view through the yoke of the connecter and showing my improvements, and Figure 3 is a sectional detail on the line 3—3 of Figure 2.

A hollow yoke A spans the bracket B and is suitably connected to a coupling head C of any desired type, the yoke and the head being pivotally supported on the bracket. I preferably press the forward hollow end 5 of the yoke into a bore in the head C. In this end of the yoke, and resting on an interior annular seat 6 formed in such end, I mount the conduit D, which suitably carries at its forward end a gasket 7 of any desired form, preferably of the self-sealing or expansible type having an interior annular groove 8. The conduit curves laterally out of the opening in the yoke A and is provided with a lug 9 of any desired shape preferably cylindrical. The lug rests in a seat or bearing 10 on one side of the yoke A and adjacent the opening in the forward end of the latter. On one side of the yoke I provide a perforated bearing comprising brackets 11 having lugs 12 which span the elongated rectangular portion 14 of the plunger pin 15 to prevent rotation of the pin. The pin is actuated by and reciprocates in a rotatable threaded wing nut 16 which lies between the brackets 11 of the bearing, and the forward end of the pin suitably engages a seat on the lug 9 of the conduit D. The arrangement provides a longitudinally movable pin which, not being rotatable cannot work loose, firmly anchors the conduit in place and permits it to be safely gradually released when under full air pressure. The annular seat 6 serves as a guide for positioning the front end of the fitting in its housing in the yoke as the fitting is adjusted forward to the service position by the thrust pin 15. The locking effect between this pin and the lug 9 of the conduit is augmented by the pressure of the fluid acting on and expanding the gasket. A train pipe hose 17 is suitably connected to the conduit D.

What I claim is:

1. An automatic train pipe connecter comprising in combination, a head supporting member having a hollow forward end, a conduit removably mounted in said end, a bearing on one side of said member comprising spaced perforated brackets, a thrust pin mounted in said bearing, a threaded wing nut mounted between said brackets and adapted to be rotated to shift said pin along said bearing into and out of engagement with a part of said conduit whereby the conduit may be removed and replaced for the purpose described, and means for preventing said pin from working loose in service, said means including a rectangular shaped portion on said pin riding in a complementarily way formed on said bearing.

2. An automatic train pipe connecter comprising in combination, a head supporting member, a coupling head carried at the forward end thereof, a conduit removably mounted on said member with one end disposed forwardly for coupling engagement with a corresponding conduit adapted to be coupled therewith, and means for anchoring said conduit on said member, said means including a lug on said conduit projecting laterally and rearwardly therefrom, a forwardly and laterally extending seat on said member, said seat and lug being parallel to each other, angularly disposed with respect to the horizontal center-line of said member, and adapted to coact to limit forward movement of the conduit in mounting the latter on the head supporting member, and adjustable thrust means acting on said lug for forcibly holding the lug firmly on its seat.

3. An automatic train pipe connecter comprising, in combination, a head supporting member, a coupling head carried at the forward end thereof, a conduit removably mounted on said member with one end disposed forwardly for coupling engagement with a corresponding conduit adapted to be coupled therewith, and means for anchoring said conduit on said member, said means including a lug on said conduit projecting laterally and rearwardly therefrom, a forwardly and laterally extending seat on said member, said seat and lug being parallel to each other, angularly disposed with respect to the horizontal center-line of said member, and adapted to coact to limit forward movement of the conduit in mounting the latter on the head supporting member, thrust means, a plurality of supporting members for said thrust means spaced in relation to each other, and means arranged between said supporting members for shifting said thrust means for acting upon said lug to thereby forcibly hold the lug firmly on its seat.

4. An automatic train pipe connecter, comprising, in combination, a head supporting member, a coupling head carried at the forward end thereof, a conduit removably mounted on said member with one end disposed forwardly for coupling engagement with a corresponding conduit adapted to be coupled therewith, and means for anchoring said conduit on said member, said means including a lug on said conduit projecting laterally and rearwardly therefrom, a forwardly and laterally extending portion on said member, said lug and forwardly and laterally extending portion being adapted to cooperate for positioning said conduit in regard to said member and to limit forward movement of the conduit and means angularly disposed to said member for shifting said conduit into cooperative position with said supporting member.

JOSEPH ROBINSON.